United States Patent [19]

Bolante

[11] 4,362,284

[45] Dec. 7, 1982

[54] FASTENER FOR ATTACHING ELECTRICAL BOXES TO STEEL STUDS

[75] Inventor: Jay J. Bolante, Chicago, Ill.

[73] Assignee: Appleton Electric Company, Chicago, Ill.

[21] Appl. No.: 203,468

[22] Filed: Nov. 3, 1980

[51] Int. Cl.³ .............................................. H02G 3/08
[52] U.S. Cl. .............................. 248/205 R; 248/226.5; 248/229; 403/387
[58] Field of Search ................. 248/DIG. 6, 229, 228, 248/226.5, 72, 205 R; 403/387, 389

[56] References Cited

U.S. PATENT DOCUMENTS

| | | | |
|---|---|---|---|
| 2,504,086 | 4/1950 | Peters, Jr. ...................... | 248/72 UX |
| 2,537,928 | 1/1951 | Churchill ......................... | 248/72 X |
| 3,003,735 | 10/1961 | Havener .............................. | 248/228 |
| 3,180,597 | 4/1965 | Havener ................................ | 248/68 |
| 3,233,297 | 2/1966 | Havener .................................. | 24/81 |
| 3,494,646 | 2/1970 | Cumber .......................... | 287/189.36 |
| 3,720,395 | 3/1973 | Schuplin ......................... | 248/229 X |

Primary Examiner—Andrew V. Kundrat
Attorney, Agent, or Firm—Jon L. Liljequist

[57] ABSTRACT

A stamped, sheetmetal fastener for attaching electrical boxes or the like to steel studs or the like includes a first portion designed for attachment to an electrical box and a second portion designed for attachment to one of the flanges of a metal stud. The electrical box attachment portion comprises a wide and flat strip of sheetmetal with its midportions struck out so as to form a leg parallel thereto that has teeth thereon for gripping the electrical box. The flat strip and its parallel leg together slip snugly over the edge of an electrical box sidewall, and the teeth on the leg bite into that sidewall to create a semi-permanent connection therewith. The metal stud attachment portion includes a pair of widely spaced appendages or fingers formed to fit over the inwardly turned lip at the outermost end of the stud flange, and also a third arm-like appendage between the widely spaced pair of fingers which acts in concert therewith so as to grip and push against the outer flange extremities to thereby lock the fastener, and thus the electrical box, to the metal stud.

2 Claims, 5 Drawing Figures

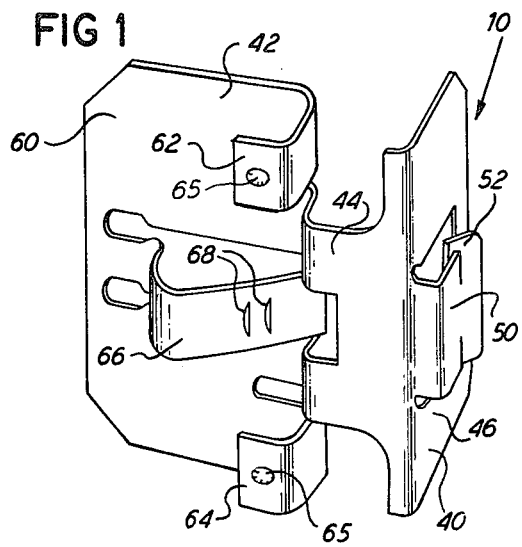
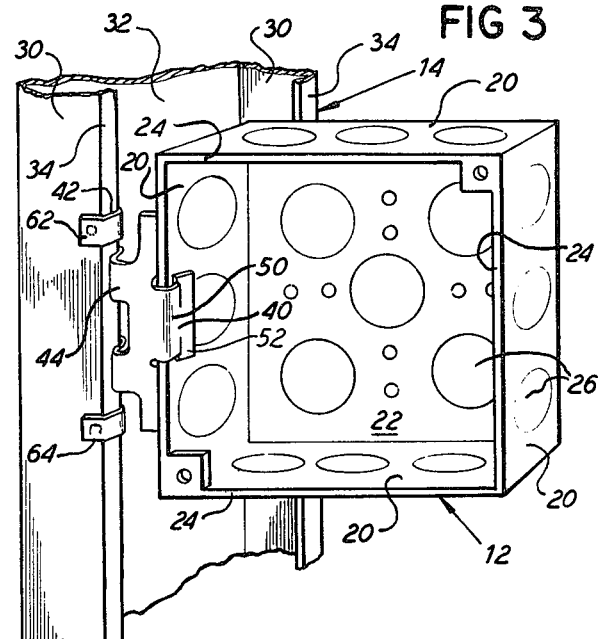
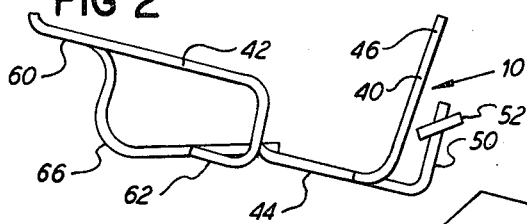
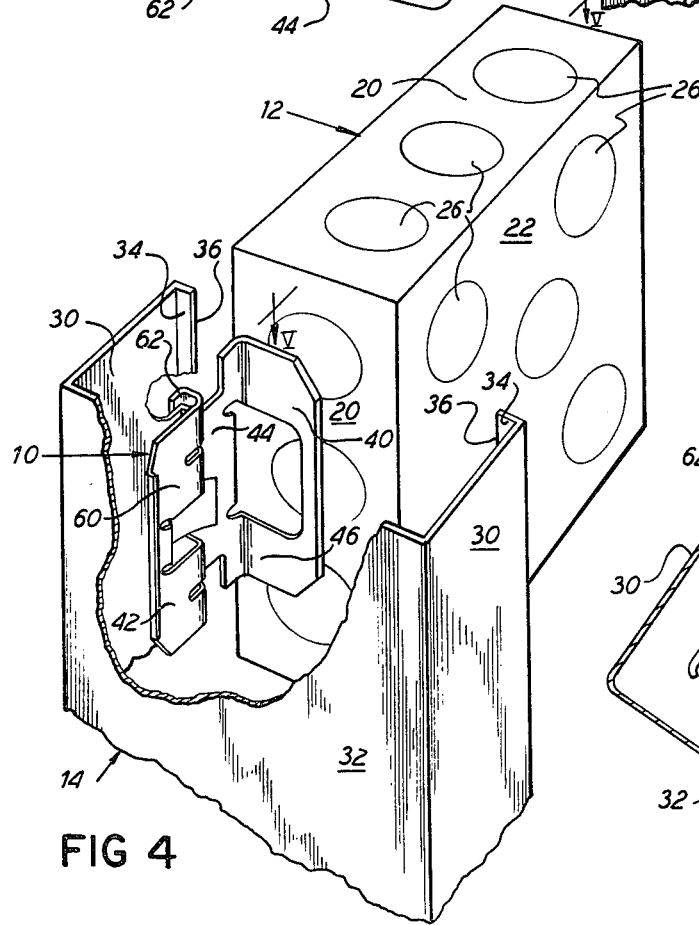
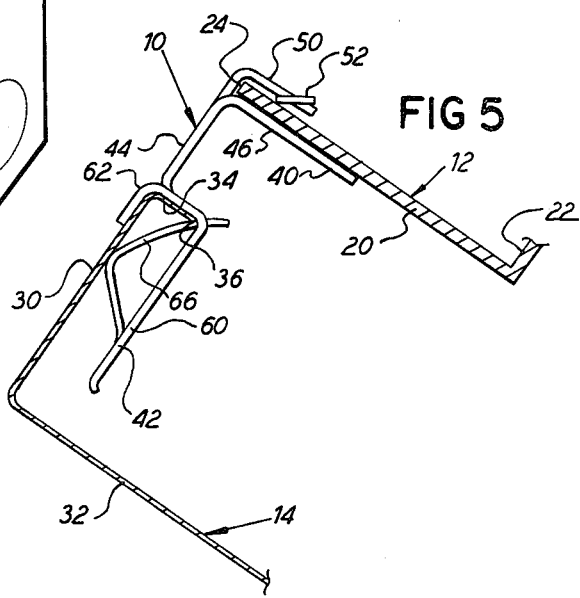

FASTENER FOR ATTACHING ELECTRICAL BOXES TO STEEL STUDS

BACKGROUND AND SUMMARY OF THE INVENTION

This invention relates broadly to a fastening device for securing objects to metal channels or studs, and more particularly to a sheetmetal fastener or clip for securing an electrical box to a metal stud.

In new construction, electrical junction boxes have traditionally been secured to wall framing (usually to wooden studs) before the wall is plastered or before the drywall or wallboard is fastened in place. The known means by which electrical boxes are fastened to wooden studs usually involve either the use of nails or the use of nail-like projections formed integrally with the electrical boxes, box brackets or box hangers.

Metal studs begin gaining prominence in the construction industry after World War II. Originally they were used largely for room partitioning. Their use expanded as the cost of metal studs became competitive with those of wood. Unfortunately, the use of a sheetmetal stud in place of a wooden stud prevents the use of nails or nail-like fasteners.

At this time there are a number of patented and unpatented clips or fasteners commercially available for the purpose of attaching electrical boxes to metal studs. Usually they attach to the metal stud by gripping it under pressure supplied by their own spring-temper steel appendages. However, some cannot be universally used on all electrical boxes or on all sizes of metal studs. Other are flimsy, while yet others are difficult to install.

It is thus an object of this invention to provide an improved fastener or clip for attaching electrical boxes or the like to metal studs that is affixable universally to essentially all sheetmetal boxes as well as to any standard size metal stud. Another object is to provide the clip or fastener with means that securely holds the electrical box to the metal stud so as to prevent slipping or cocking of the electrical box once installed onto a metal stud.

In providing these desirable characteristics, the improved fastener of this enclosure includes a first portion with a pair of widely spaced fingers or appendages that hook over the lip on the outermost edge of one of the stud flanges. A third appendage braces itself both on the inner surface of that stud flange and simultaneously pushes against the flange lip to cause the pair of widely spaced fingers to securely dig into the flange. Several locking stops are provided on this third appendage so that it will attach properly to studs with different width lips. Another portion of the fastener mounts to the electrical box by snugly slipping over and biting into an exposed edge on one of its sidewalls. Thus, proper electrical ground continuity is maintained between electrical box and metal stud.

DESCRIPTION OF THE DRAWINGS

FIG. 1 is a generally frontal perpective view of a fastener incorporating the principles of the present invention.

FIG. 2 is a top edge view of the fastener shown in FIG. 1.

FIG. 3 is a perspective view of the fastener similar to FIG. 1, but here shown connecting a standard electrical box to a metal stud.

FIG. 4 is a generally rear perspective view of the fastener connecting a standard electrical box to a metal stud, portions of the metal stud being cut away to better show the manner in which the connection is made.

FIG. 5 is a partially cross sectional view of a metal stud and electrical box connected by the new and improved fastener, this view being taken substantially along the lines 5—5 of FIG. 4.

DESCRIPTION OF PREFERRED EMBODIMENT

Referring now to the drawings, there is shown an improved clip or fastener designated generally 10 for securing an electrical box or the like shown generally at 12 to a metal stud shown generally at 14.

The electrical box 12 can be of standard construction including four sidewalls 20 and a rear wall 22. Sidewalls 20 each extend forwardly from rear wall 22 and terminate in a front edge 24. Both of the sidewalls and rear wall typically include a plurality of knockouts 26 therein, as is well known, for bringing electrical wires or cables into the electrical box.

Metal stud 14 is generally channel shaped and includes a parallel pair of flanges 30 joined at their inner ends by a perpendicular web 32. The outermost extremities of flanges 30, those spaced furthest from web 32, are bent at right angles to the flanges and thus create an inturned lip 34 terminating with an edge 36.

Sheetmetal fastener 10 includes an electrical box attachment portion 40 and a metal stud attachment portion 42 connected together by an intermediary portion 44.

When the fastener 10 is connected to a metal stud, the electrical box attachment portion 40 extends rearwardly, i.e., perpendicularly away from the plane of edges 24. Portion 40 is largely a flat strip or plane of sheetmetal 46, and struck from its mid-portions is a generally parallel leg 50 having its outermost end 52 canted inwardly and forwardly. As can be seen perhaps best in FIG. 5, the two closely spaced and parallel surfaces 46 and 50 of portion 40 slip over one of the sidewalls 20 of an electrical box, and inwardly turned extremities 52 of leg 50 bite into the sidewall 20 to securely hold the clip or fastener 10 thereto.

Metal stud attachment portion 42 includes a flat and planar base portion 60 having three appendages formed therefrom. Two widely spaced and generally U-shaped fingers 62 and 64 are designed to slip over the outermost extremities including the lip 34 of the metal stud. Each finger is dimpled as at 65 to facilitate adjustment of the box longitudinally along the stud. A third appendage 66 in the form of an arm comprises means for applying pressure to the metal stud in such a manner as to cause itself and the other two appendages to squeeze the stud extremities therebetween, thereby locking the fastener 10 to the metal stud. Appendage 66 has several stops 68 formed therein, and one of these (depending upon the width of lip 34) will bear against stud edge 36 for greater rigidity.

This can perhaps best be seen with a comparison of FIGS. 2 and 5. Arm-like appendage 66 simultaneously pushes against the inner surface of flange 30 and against edge 36. The direction of this applied force draws fingers 62 and 64 in the opposite direction so as to clamp the lip 34 and outer portions of flange 30 therebetween. This securely locks fastener 10 to the metal stud, and because the electrical box 12 is already securely clamped to metal fastener 10, electrical box 12 is fixed relative to metal stud 14.

Attachment of fastener 10 to the electrical box simply involves pushing it over a sidewall 20 as far as it will go, and attachment of the fastener and electrical box combination to the metal stud requires only a little more effort. Perhaps the simpliest technique is to first properly orient the box with fastener 10 adjacent lip 34 and the four box edges 24 generally in the plane of the eventual wall (parallel with the closest flange 30). Then cock the upper edge of the box forward and slip finger 62 over stud lip 34, generally as shown in FIG. 3, and then bring the bottom of the box forwardly and slip finger 64 also over lip 34, at which time the fastener snaps in place and is securely locked to the metal stud. Movement of the box and fastener combination longitudinally along the stud is achieved simply by applying an appropriate degree of force in the direction it is desired to move the box. The amount of force required depends entirely upon the design of the fastener, this including the thickness of its sheetmetal, lengths of the three appendages, and also the degree of spring temper in the fastener material brought about during heat treatment.

The above disclosure is offered for public dissemination in return for the grant of a patent. Although it is detailed to insure adequacy and aid understanding, this is not inteded to prejudice that purpose of the patent which is to cover each new and inventive concept contained therein no matter how others may later disguise it by variations in form or additions for further improvements. The true breadth or scope of the invention is to be determined by the language used in the claims herein when given in its broadest, reasonable interpretation.

I claim:

1. An improved fastener for attaching an electrical box to a formed sheetmetal member, said member including a flange with a lip turned generally at a right angle thereto and terminating in an edge, the improved fastener attaching only to the flange and lip and comprising:

a piece of formed metal having an electrical box attachment portion and a sheetmetal member attachment portion, said electrical box attachment portion including means for securely affixing said fastener to said electrical box, said sheetmetal member attachment portion being spaced from the electrical box attachment portion and having at least one finger extending therefrom designed to fit over said lip and part of said flange, said sheetmetal member attachment portion also having pressure application means extending therefrom in the form of an elongate and resilient appendage having midportions that push against said edge in an outward direction so as to drive said finger into compressive contact with said flange and lip to thereby lock the fastener thereto, said midpoints including at least two longitudinally spaced locking stops extending outwardly therefrom, one of which engages the lip edge for preventing slipping between said appendage and lip.

2. For use in rigidly attaching a sheetmetal electrical box to a sheetmetal stud of generally channel shape, said stud including a pair of parallel flanges, each having an inner extremity and an outer extremity, the inner extremities of the two flanges being connected by a web lying generally at right angles thereto, and the outer extremities of each flange having a short lip portion turned toward the outer extremities of the other flange and terminating in an edge, the electrical box including a plurality of sidewalls and a backwall; an improved fastener that attaches only to the flange and short lip portion without engaging the web, comprising:

a blanked and formed piece of sheetmetal, said piece of sheetmetal including an electrical box attachment portion and spaced therefrom a metal stud attachment portion, said electrical box attachment portion having a pair of parallel surfaces spaced apart approximately the thickness of the electrical box sidewall for snugly slipping thereover, said stud attachment portion including two appendages in the form of a pair of relatively widely spaced fingers which are generally U-shaped in cross section and which slip over the outer extremities of the stud flange, said electrical box attachment portion also including another appendage in the form of an angled arm having midportions that bear both on the inner surface of the flange and also simultaneously against the lip edge in a direction to draw the fingers into the stud and thereby lock the fastener thereto.

* * * * *